United States Patent
Nakajima et al.

(10) Patent No.: US 6,393,170 B1
(45) Date of Patent: May 21, 2002

(54) OPTICAL MULTIPLEXER/DEMULTIPLEXER

(75) Inventors: Takeshi Nakajima, Ichihara; Naoki Hashizume, Yokohama; Kanji Tanaka, Ichihara, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/582,084
(22) PCT Filed: Oct. 19, 1999
(86) PCT No.: PCT/JP99/05749
  § 371 Date: Jun. 22, 2000
  § 102(e) Date: Jun. 22, 2000
(87) PCT Pub. No.: WO00/23837
  PCT Pub. Date: Apr. 27, 2000

(30) Foreign Application Priority Data

Oct. 22, 1998 (JP) .......................................... 10-300684

(51) Int. Cl.⁷ .................................................. G02B 6/12
(52) U.S. Cl. .............................. 385/14; 385/15; 385/24; 385/42; 359/124
(58) Field of Search .............................. 385/24, 14, 15, 385/42; 359/124

(56) References Cited

U.S. PATENT DOCUMENTS 5,546,483 A * 8/1996 Inoue et al. .................. 385/14
5,943,452 A * 8/1999 Himeno et al. ............... 385/15

FOREIGN PATENT DOCUMENTS

JP  949936  * 2/1997  ...................... 6/122
JP  11002733  * 1/1999  ...................... 6/12

* cited by examiner

Primary Examiner—Cassandra Spyrou
Assistant Examiner—Christopher S. Maxie
(74) Attorney, Agent, or Firm—Oblon, Spivak, McClelland, Maier & Neustadt, P.C.

(57) ABSTRACT

An optical multiplexer/demultiplexer 1 having a plurality of first waveguides 3, a first slab waveguide 4, an arrayed waveguide grating 5 having a plurality of waveguides, a second slab waveguide 6 and a plurality of second waveguides 7, the individual waveguides being connected in the above order. The ratio of a distance between the plurality of first waveguides 3 at a connecting portion with the first slab waveguide 4 to a distance between the plurality of second waveguides 7 at a connecting portion with the second slab waveguide 6 differs from a ratio of a focal length of the first slab waveguide 4 to a focal length of the second slab waveguide 6.

3 Claims, 3 Drawing Sheets

OPTICAL MULTIPLEXER/DEMULTIPLEXER

TECHNICAL FIELD

The present invention relates to an optical multiplexer/demultiplexer using an arrayed waveguide grating.

BACKGROUND ART

Recently, studies and development of optical frequency division multiplexing communications are being actively made in optical communications as means for significantly increasing the transmission capacity. Significantly increasing the transmission capacity in optical communications requires an optical device which can multiplex and demultiplex light having multiple wavelength components with as small a wavelength interval as possible. As one such means is known an optical multiplexer/demultiplexer using an arrayed waveguide grating (e.g., Japanese Unexamined Patent Publication (KOKAI) No. Hei 9-49936, etc.).

This optical multiplexer/demultiplexer has a plurality of input waveguides, an input-side slab waveguide, an arrayed waveguide grating having a plurality of waveguides, an output-side slab waveguide and a plurality of output waveguides connected in the named order. And, this optical multiplexer/demultiplexer transmits, for example, wavelength-multiplexed light (center wavelength $\lambda 1$ to $\lambda 8$, wavelength interval $\Delta \lambda$) inject to a specific one of the input waveguides to the input-side slab waveguide, then to the arrayed waveguide grating having a plurality of waveguides, and then to the output-side slab waveguide to demultiplex it to lights of center wavelengths $\lambda 1$ to $\lambda 8$, and outputs them to the determined waveguides in the plurality of output waveguides.

At the time of fabrication processing waveguides of the arrayed waveguide grating, the widths, heights and refractive indexes of the waveguides to be fabricated vary so that the center wavelength of the light that is demultiplexed by the output-side slab waveguide is likely to deviate from the designed value.

At this time, if the deviation of the center wavelength of the light from the design value is a given deviation amount from a pre-designed, predetermined center wavelength even if the arrayed waveguide grating differs, the deviation is correctable when dealt with at the design stage and does not raise a problem. If the deviation of the center wavelength differs from one manufactured optical multiplexer/demultiplexer to another, however, it cannot be corrected. What is more, such deviation of the center wavelength usually differs from one arrayed waveguide grating to another.

For an optical multiplexer/demultiplexer using an arrayed waveguide grating, therefore, it is difficult to previously estimate the deviation of the center wavelength after production, which is a factor to considerably reduce the production yield of optical multiplexers/demultiplexers.

Accordingly, it is an object of the present invention to provide an optical multiplexer/demultiplexer which can adequately correct a deviation of the center wavelength to ensure multiplexing and demultiplexing of wavelength-multiplexed light even if an arrayed waveguide grating is used, and which can be produced at a low cost with a high yield.

DISCLOSURE OF THE INVENTION

To achieve the above object, according to this invention, an optical multiplexer/demultiplexer having a plurality of first waveguides, a first slab waveguide, an arrayed waveguide grating having a plurality of waveguides, a second slab waveguide and a plurality of second waveguides, said individual waveguides being connected in the above-said order, is constituted in such a way that a ratio of a distance between the plurality of first waveguides at a connecting portion with the first slab waveguide to a distance between the plurality of second waveguides at a connecting portion with the second slab waveguide differs from a ratio of a focal length of the first slab waveguide to a focal length of the second slab waveguide.

Preferably, it is constituted in such a way that the distance between the plurality of first waveguides at the connecting portion with the first slab waveguide is equal to the distance between the plurality of second waveguides at the connecting portion with the second slab waveguide; and the focal length of the first slab waveguide differs from the focal length of the second slab waveguide.

Or, preferably, it is constituted in such a way that the distance between the plurality of first waveguides at the connecting portion with the first slab waveguide differs from the distance between the plurality of second waveguides at the connecting portion with the second slab waveguide; and the focal length of the first slab waveguide is equal to the focal length of the second slab waveguide.

The center wavelength used in this specification means the center wavelength of light which has been demultiplexed from wavelength-multiplexed light.

BEST MODE FOR CARRYING OUT THE INVENTION

One embodiment of the present invention will now be described with reference to FIGS. 1 through 4.

Figure 1:
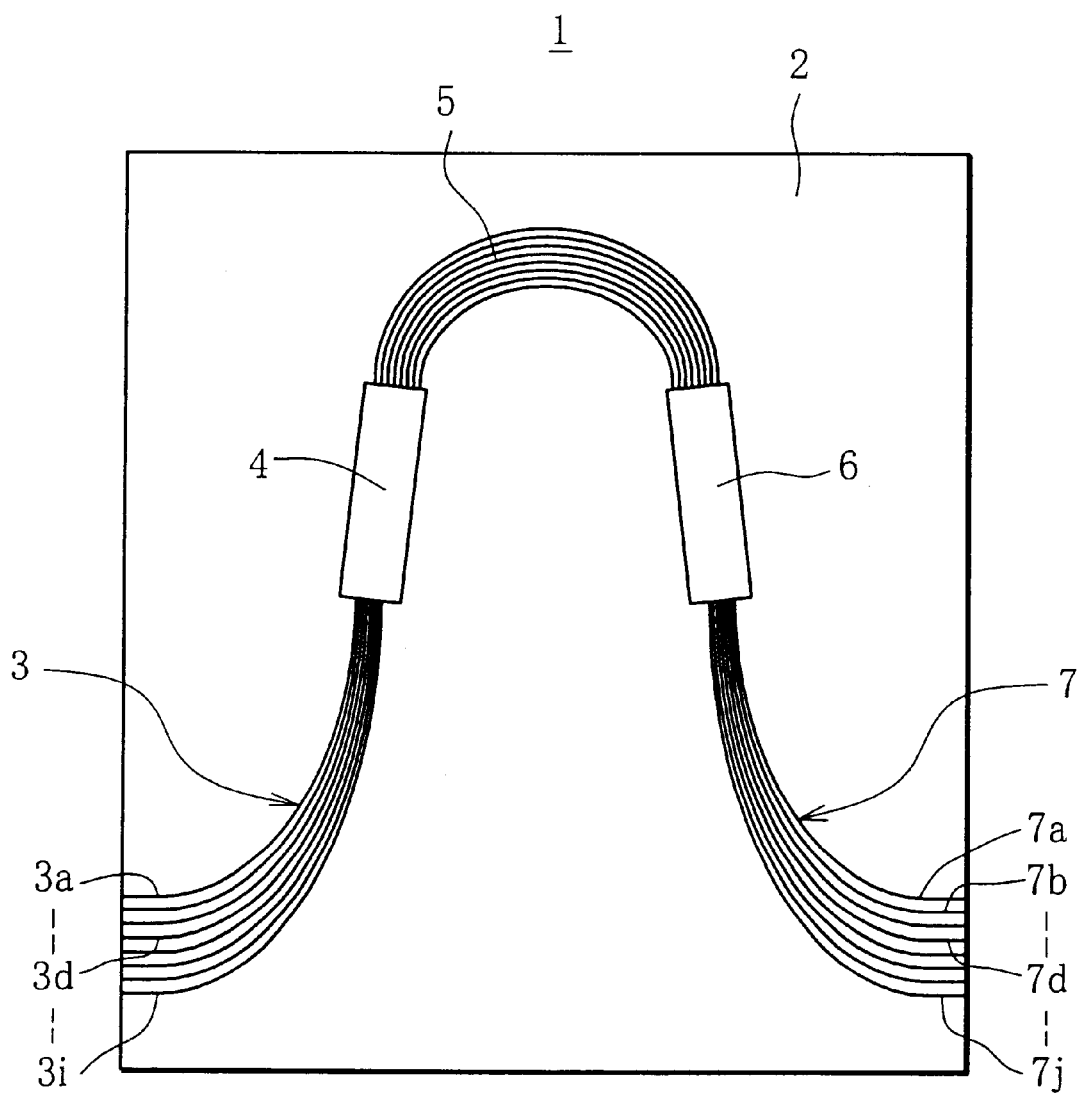
FIG. 1 is a plan view of an optical multiplexer/demultiplexer according to this invention.

As shown in FIG. 1, an optical multiplexer/demultiplexer 1 has, on a substrate 2 of silicon, glass or the like, a plurality of input waveguides 3 of quartz glass as first waveguides, an input-side slab waveguide 4 as a first slab waveguide, an arrayed waveguide grating 5, an output-side slab waveguide as a second slab waveguide and a plurality of output waveguides 7 as second waveguides connected in the above-said order.

Figure 2A:
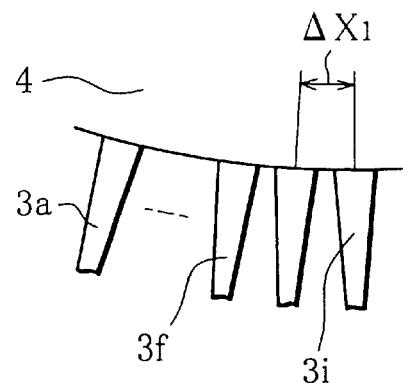
FIG. 2A is an enlarged plan view showing a pitch $\Delta X1$ of a plurality of input waveguides on the input-side slab waveguide side.

The plurality of input waveguides 3 have one ends exposed to the end face of the silicon substrate 2 and the other ends connected to the input-side slab waveguide 4. At the connecting portion, as shown in FIG. 2A, the plurality of input waveguides 3 are connected at a pitch $\Delta X1$. At this time, wavelength-multiplexed light to be demultiplexed via an optical waveguide, such as an optical fiber, enters one of the plurality of input waveguides 3.

The input-side slab waveguide 4 is a concave type slab waveguide having a focal length F1 and diffracts wavelength-multiplexed light entered from a specific input waveguide 3 and emits it to the arrayed waveguide grating 5.

The arrayed waveguide grating 5 is a diffraction grating which employs a difference $\Delta L$ (=optical path length difference) between adjoining waveguides, and has a plurality of channel waveguides whose quantity is sufficient for receiving all incident lights that have spread by the diffraction in the input-side slab waveguide 4. The spacings between the plurality of waveguides in the arrayed waveguide grating 5 at both ends of the input-side slab waveguide 4 and the output-side slab waveguide 6 are set equal to each other. The plurality of waveguides that constitute the arrayed waveguide grating 5 have connecting portions to the input-side slab waveguide 4 and the output-side slab waveguide 6 enlarged in a tapered form.

The output-side slab waveguide 6 is a concave type slab waveguide having a focal length F2 and condenses wavelength-multiplexed light propagated in the arrayed waveguide grating 5 to the plurality of output waveguides 7. At this time, the condensing positions of the wavelength-multiplexed light to the plurality of output waveguides 7 differ wavelength by wavelength due to the angular dispersion at the arrayed waveguide grating 5, so that the wavelength-multiplexed light goes out to different output waveguides 7 wavelength by wavelength.

Figure 2B:
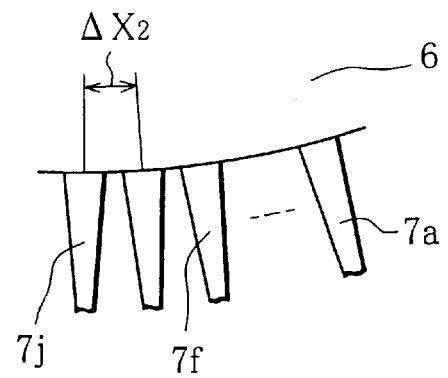
FIG. 2B is an enlarged plan view showing a pitch $\Delta X2$ of a plurality of output waveguides on the output-side slab waveguide side.

The plurality of output waveguides 7 have one ends exposed to the end face of the silicon substrate 2 and the other ends connected to the output-side slab waveguide 6. At the connecting portion, as shown in FIG. 2B, the plurality of output waveguides 7 are connected at a pitch $\Delta X2$. At this time, the connecting portions of the plurality of input waveguides 3 and the plurality of output waveguides 7 to the input-side slab waveguide 4 and the output-side slab waveguide 6 are arranged on a Rowland circle. Here, the Rowland circle is a circle whose diameter is a perpendicular line set at the center of the concave grating and is equal to the radius of curvature of the concave and which lies in a plane perpendicular to the engraving of the grating (see "Kagaku Daijiten (Encyclopaedia Chimica) No. 9" published by KYORITSU Publishing Co.).

The optical multiplexer/demultiplexer 1 is constituted as described above, and is characterized in that the ratio of the pitch $\Delta X1$ of the plurality of input waveguides 3 at the connecting portions to the input-side slab waveguide 4 to the pitch $\Delta X2$ of the plurality of output waveguides 7 at the connecting portions to the output-side slab waveguide 6 differs from the ratio of the focal length F1 of the input-side slab waveguide 4 to the focal length F2 of the output-side slab waveguide 6.

Further, the optical multiplexer/demultiplexer 1 is constituted in such a manner that the pitch $\Delta X1$ of the plurality of input waveguides 3 at the connecting portions to the input-side slab waveguide 4 is equal to the pitch $\Delta X2$ of the plurality of output waveguides 7 at the connecting portions to the output-side slab waveguide 6 and the focal length F1 of the input-side slab waveguide 4 differs from the focal length F2 of the output-side slab waveguide 6. Furthermore, the optical multiplexer/demultiplexer 1 is constituted in such a manner that the pitch $\Delta X1$ of the plurality of input waveguides 3 at the connecting portions to the input-side slab waveguide 4 differs from the pitch $\Delta X2$ of the plurality of output waveguides 7 at the connecting portions to the output-side slab waveguide 6 and the focal length F1 of the input-side slab waveguide 4 is equal to the focal length F2 of the output-side slab waveguide 6.

Figure 5:
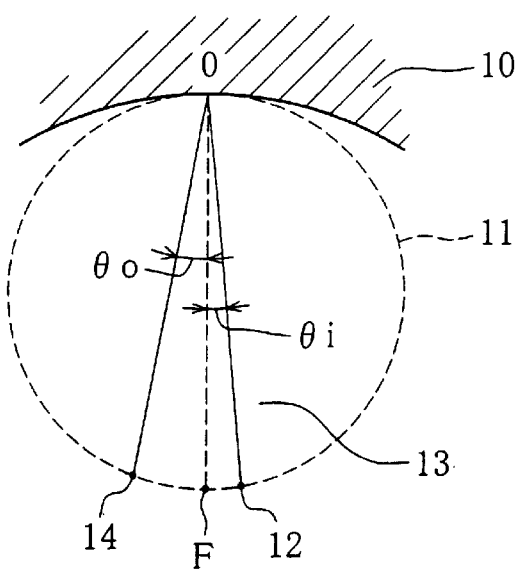
FIG. 5 is a type diagram for explaining the operational principle of the optical multiplexer/demultiplexer in FIG. 1 using a concave diffraction grating.

The operational principle of the thus constituted optical multiplexer/demultiplexer 1 can be explained as follows by using a concave diffraction grating 10 shown in FIG. 5.

First, the concave diffraction grating 10 has the grating formed at a pitch d and has a radius of curvature R. Let us consider a Rowland circle 11 (radius=R/2) which is in contact with the surface of the concave diffraction grating 10 at a center O of the concave diffraction grating 10. At this time, a point F in FIG. 5 is the focal point of the concave diffraction grating 10.

When an input slit 12 is placed at an arbitrary position on the Rowland circle 11 and light is let to enter through the input slit 12, this incident light is diffracted by the concave diffraction grating 10 at an angle which satisfies the following diffraction equation and is condensed on a point on the Rowland circle 11.

$$n_R d(\sin\theta_i + \sin\theta_o) = m\lambda \tag{Eq. 1}$$

where $\theta_1$ is the incident angle, $\theta_o$ is the outgoing angle, $n_R$ is the refractive index of a medium 13 in the Rowland circle 11, m is the diffraction order, $\lambda$ is the wavelength and d is the pitch of the diffraction grating.

If an output slit 14 is formed at the condensing position, therefore, diffraction light having the specific wavelength $\lambda$ and the specific order m alone can be output.

As mentioned above, the connecting portions of the plurality of input waveguides 3 and the plurality of output waveguides 7 of the optical multiplexer/demultiplexer 1 to the input-side slab waveguide 4 and the output-side slab waveguide 6 are arranged on the Rowland circle.

In the optical multiplexer/demultiplexer 1, therefore, the plurality of input waveguides 3, the input-side slab waveguide 4, and the connecting portion of the input-side slab waveguide 4 and the arrayed waveguide grating 5 respectively correspond to the input slit 12, the medium 13 and the grating plane of the concave diffraction grating 10. Likewise, the plurality of output waveguides 7, the output-side slab waveguide 6, and the connecting portion of the arrayed waveguide grating 5 and the output-side slab waveguide 6 respectively correspond to the output slit 14, the medium 13 and the grating plane of the concave diffraction grating 10. The focal length F1 and F2 of the input-side slab waveguide 4 and the output-side slab waveguide 6 correspond to the focal length of the concave diffraction grating 10.

The arrayed waveguide grating 5 of the optical multiplexer/demultiplexer 1 has a plurality of channel waveguides and the optical path length difference $\Delta L$ between the N-th and (N+1)-th waveguides (N being a natural number) is set constant. Accordingly, as wavelength-multiplexed light propagates over the entire length from the connecting portion to the input-side slab waveguide 4 to the connecting portion to the output-side slab waveguide 6, the arrayed waveguide grating 5 will have the same diffraction performance as the concave diffraction grating 10.

Therefore, the optical multiplexer/demultiplexer 1 transmits, for example, wavelength-multiplexed light (center wavelength $\lambda 1$ to $\lambda 8$, wavelength interval $\Delta\lambda$) inject to the fourth waveguide $3d$ in the input waveguides 3 to the input-side slab waveguide 4, then to the arrayed waveguide grating 5, and then to the output-side slab waveguide 6 to demultiplex it to lights with center wavelengths λ1 to λ8, and outputs them to the associated waveguides in the plurality of output waveguides 7.

At this time, the optical multiplexer/demultiplexer 1 of this invention is characterized in that the ratio of the pitch ΔX1 of the plurality of input waveguides 3 at the connecting portions to the input-side slab waveguide 4 to the pitch ΔX2 of the plurality of output waveguides 7 at the connecting portions to the output-side slab waveguide 6 differs from the ratio of the focal length F1 of the input-side slab waveguide 4 to the focal length F2 of the output-side slab waveguide 6.

The function of the optical multiplexer/demultiplexer 1 to multiplex or demultiplex wavelength-multiplexed light by correcting a deviation of the center wavelength can be explained based on two types of Rowland circles as follows.

Figure 3:
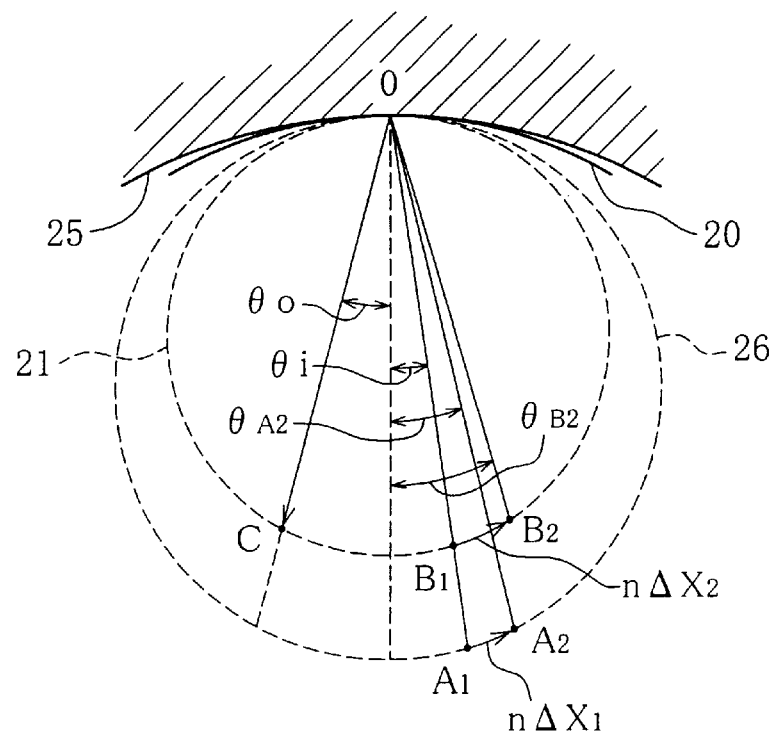
FIG. 3 is a type diagram for explaining the function of the optical multiplexer/demultiplexer in FIG. 1.

First, let us consider the case where the connecting portions of the plurality of input waveguides 3 and the plurality of output waveguides 7 of the optical multiplexer/demultiplexer 1 to the input-side slab waveguide 4 and the output-side slab waveguide 6 are arranged on a Rowland circle 21 in the type diagram shown in FIG. 3.

With regard to the Rowland circle 21 of the concave diffraction grating 20, when light having the wavelength λ and the diffraction order m is let to enter from a point B1 on the circle 21 and this incident light is diffracted by the concave diffraction grating 20 and condensed on another point C on the circle 21 (this is designated as case 1), the diffraction equation is expressed by the following equation which is derived by adding a phase difference $n_c \Delta L$ generated in the arrayed waveguide grating 5 to the left-hand side of the equation 1.

$$n_R d(\sin \theta_i + \sin \theta_o) + n_c \Delta L = m\lambda \quad \text{(Eq. 2)}$$

where $n_c$ is the effective refractive index of the arrayed waveguide grating 5 and the ΔL is the optical path length difference between adjacent waveguides in the arrayed waveguide grating 5.

When light having a wavelength λB2 and the diffraction order m is let to enter from a point B2 on the Rowland circle 21 apart from the point B1 by nΔX2 (n being an integer) and this incident light is diffracted by the concave diffraction grating 20 and condensed on the point C (this is designated as case 2), the diffraction equation is expressed by the following equation with an incident angle being $\theta_{B2}$ in the same way as done in the above.

$$n_R d(\sin \theta_{B2} + \sin \theta_o) + n_c \Delta L = m\lambda_{B2} \quad \text{(Eq. 3)}$$

Therefore, the following equation 4 is derived from the equation 2 and the equation 3.

$$\lambda_{B2} - \lambda = n_R d/m (\sin \theta_{B2} - \sin \theta_i) \quad \text{(Eq. 4)}$$

Next, let us consider the case where the connecting portions of the plurality of input waveguides 3 to the input-side slab waveguide 4 are arranged on a Rowland circle 26 of a concave diffraction grating 25 and the connecting portions of the plurality of output waveguides 7 to the output-side slab waveguide 6 are arranged on the Rowland circle 21 in FIG. 3.

Here, the concave diffraction gratings 20 and 25 have a common center O and a point A1 on the Rowland circle 26 lies on the extension of OB1.

At this time, when light having the wavelength λ and the diffraction order m is let to enter from the point A1 on the Rowland circle 26 and this incident light is diffracted by the concave diffraction grating 25 and condensed on the point C (this is designated as case 3), the diffraction equation is expressed by the same as the equation 2 because the incident angle and outgoing angle are both the same.

$$n_R d(\sin \theta_i + \sin \theta_o) + n_c \Delta L = m\lambda \quad \text{(Eq. 5)}$$

When light having a wavelength λA2 and the diffraction order m is let to enter from a point A2 on the Rowland circle 26 apart from the point A1 by nΔX1 (n being an integer) and this incident light is condensed on the point C (this is designated as case 4), the diffraction equation is expressed by the following equation with an incident angle being $\theta_{A2}$ in the same way as done in the above.

$$n_R d(\sin \theta_{A2} + \sin \theta_o) + n_c \Delta L = m\lambda_{A2} \quad \text{(Eq. 6)}$$

Therefore, the following equation 7 is derived from the equation 5 and the equation 6.

$$\lambda_{A2} - \lambda = n_R d/m (\sin \theta_{A2} - \sin \theta_i) \quad \text{(Eq. 7)}$$

As θ is sufficiently small then, let $\sin \theta \approx \theta$, $\lambda_{A2} - \lambda = \Delta\lambda_A$, $\lambda_{B2} - \lambda = \Delta\lambda_B$, $\theta_{A2} - \theta_i = \Delta\theta_A$ and $\theta_{B2} - \theta_i = \Delta\theta_B$, the equations 4 and 7 can be rewritten as follows.

$$\Delta\lambda_B = (n_R d/m) \cdot \Delta\theta_B \quad \text{(Eq. 8)}$$

$$\Delta\lambda_A = (n_R d/m) \cdot \Delta\theta_A \quad \text{(Eq. 9)}$$

As the focal length of the input-side slab waveguide 4 is F1 and the focal length of the output-side slab waveguide 6 is F2, the following equation is derived from FIG. 3.

$$n\Delta X2 \approx F2 \Delta\theta_B \quad \text{(Eq. 10)}$$

$$n\Delta X1 \approx F1 \Delta\theta_A \quad \text{(Eq. 11)}$$

Therefore, the following equation is acquired by obtaining the ratio of $\Delta\lambda_A$ to $\Delta\lambda_B$ based on equations acquired by respectively substituting the equation 10 and the equation 11 into the equation 8 and the equation 9 and rearranging it.

$$\Delta\lambda_A = (\Delta X1/\Delta X2)(F2/F1)\Delta\lambda_B \quad \text{(Eq. 12)}$$

Based on this equation 12, consideration is given to the relationship among the focal length F1 of the input-side slab waveguide 4, the focal length F2 of the output-side slab waveguide 6, ΔX1 and ΔX2.

First, if the following equation 13 is satisfied, an equation 14 is derived.

$$F1:F2 = \Delta X1:\Delta X2 \quad \text{(Eq. 13)}$$

$$\Delta\lambda_A = \Delta\lambda_B \quad \text{(Eq. 14)}$$

That is, the equation 14 indicates that the amount of the deviation of the center wavelength in the output waveguides 7 with regard to the position of light incident to the Rowland circle 21 from the plurality of input waveguides 3 when the input waveguides 3 are shifted by n, i.e., nΔX2 is equal to the amount of the deviation of the center wavelength in the output waveguides 7 with regard to the position of light incident to the Rowland circle 26 when the input waveguides 3 are shifted by n, i.e., nΔX1.

As long as the equation 13 is met, therefore, the deviation of the center wavelength in the output waveguides 7 when the input waveguides 3 are shifted by n is the same as that of the conventional optical multiplexer/demultiplexer which uses the arrayed waveguide grating.

If the following equation 15 is satisfied, an equation 16 is derived.

$$F1:F2 \neq \Delta X1:\Delta X2 \quad \text{(Eq. 15)}$$

$$\Delta\lambda_A \neq \Delta\lambda_B \quad \text{(Eq. 16)}$$

That is, the equation 16 indicates that the amount of the deviation of the center wavelength in the output waveguides 7 with regard to the position of light incident to the Rowland circle 21 from the plurality of input waveguides 3 when the input waveguides 3 are shifted by n (shifted by n$\Delta X2$) differs from the amount of the deviation of the center wavelength in the output waveguides 7 with regard to the position of light incident to the Rowland circle 26 when the input waveguides 3 are shifted by n (shifted by n$\Delta X1$).

Therefore, the deviation of the center wavelength in the output waveguides 7 on the Rowland circle 21 when the input waveguides 3 are shifted by n on the Rowland circle 26 is shifted by ($\Delta X1/\Delta X2$)(F2/F1) times as apparent from the equation 12, unlike in the conventional optical multiplexer/demultiplexer using an arrayed waveguide grating.

From the above, according to the optical multiplexer/demultiplexer 1 of this invention, if the focal length F1 of the input-side slab waveguide 4, the focal length F2 of the output-side slab waveguide 6 and the pitches $\Delta X1$ and $\Delta X2$ are adequately set, light of the intended center wavelength can be condensed on a specific output waveguide 7 in the plurality of output waveguides 7 by shifting the position of that one of the plurality of input waveguides 3 where wavelength-multiplexed light is let to enter in accordance with the degree of deviation of the center wavelength caused during production, and a variation in center wavelength which is caused at the fabrication processing can be corrected.

The optical multiplexer/demultiplexer 1 can also let lights of the individual wavelengths to come from the plurality of output waveguides 7 and let them propagate through the output-side slab waveguide 6→arrayed waveguide grating 5→input-side slab waveguide 4 to be multiplexed into wavelength-multiplexed light and can let it go out to a specific waveguide in the plurality of input waveguides 3.

EXAMPLE 1

In the optical multiplexer/demultiplexer 1 shown in FIG. 1, the pitch $\Delta X1$ of the plurality of input waveguides 3 at the connecting portions to the input-side slab waveguide 4 shown in FIG. 2A and the pitch $\Delta X2$ of the plurality of output waveguides 7 at the connecting portions to the output-side slab waveguide 6 shown in FIG. 2B were set to 20 $\mu$m ($\Delta X1=\Delta X2=20$ $\mu$m), the focal length F1 of the input-side slab waveguide 4 was set to 10032 $\mu$m, the focal length F2 of the output-side slab waveguide 6 was set to 8778 $\mu$m (F1:F2=8:7), and the spectrum response were measured as follows at the wavelength interval of 100 GHz (=about 0.8 nm) in the operational wavelength band of 1.55 $\mu$m.

The other design parameters of the optical multiplexer/demultiplexer 1 were set as the multi-channel number Nch=16, line dispersion=25 $\mu$m/nm, the waveguide pitch of the arrayed waveguide grating 5=15 $\mu$m, the number of waveguides=100, the optical path length difference $\Delta L$=65.3 $\mu$m, the diffraction order m=61, and FSR (Free Spectral Range)=25 nm. Note that 20 waveguides of the output waveguides 7 were laid out.

As F1:F2=8:7 was set, the optical multiplexer/demultiplexer 1 would show the same characteristics as the conventional optical multiplexer/demultiplexer if $\Delta X1:\Delta X2$=8:7.

As $\Delta X1=\Delta X2$ was set, however, the characteristics of the optical multiplexer/demultiplexer 1 differ from the characteristics of the conventional optical multiplexer/demultiplexer.

A measurement was taken on the spectrum response of light to be emitted to a specific output waveguide 7d in the optical multiplexer/demultiplexer 1 when the input waveguide 3 where wavelength-multiplexed light enters was shifted to the fifth waveguide 3e by one from the fourth waveguide 3d. The results are shown in FIG. 4.

Figure 4:
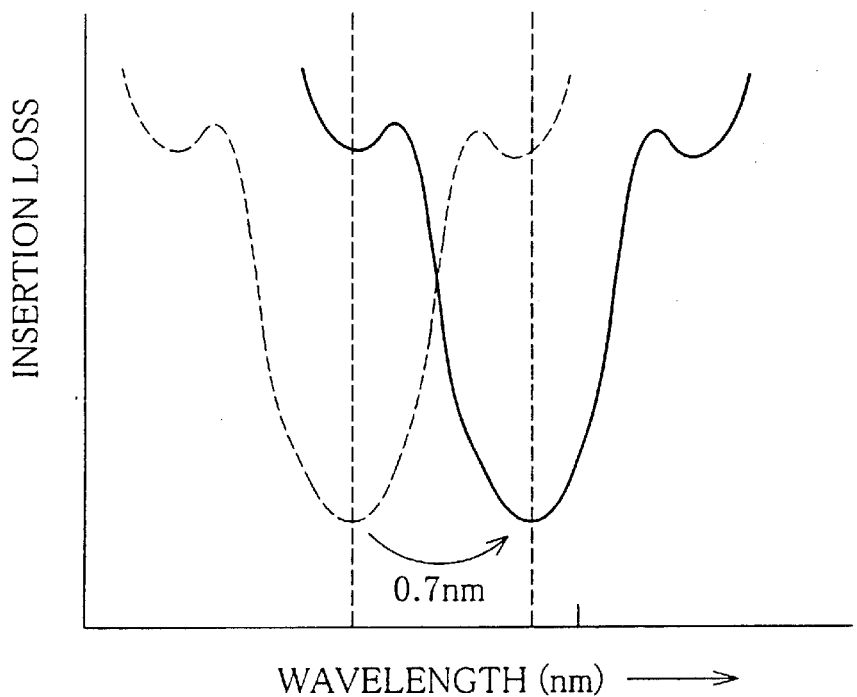
FIG. 4 is a spectrum response of outgoing light measured at a specific output waveguide when the input waveguide in the optical multiplexer/demultiplexer in FIG. 1 to which wavelength-multiplexed light is to be injected is shifted by one.

In FIG. 4, the broken line shows the spectrum response of the outgoing light measured at the output waveguide 7d when wavelength-multiplexed light was let to enter the fourth waveguide 3d, and the solid line shows the spectrum response of the outgoing light measured at the output waveguide 7d when wavelength-multiplexed light was let to enter the fifth waveguide 3e. As apparent from FIG. 4, shifting the input waveguide 3 of the optical multiplexer/demultiplexer 1 by one shifted the center wavelength of light to be emitted to the output waveguide 7 toward a longer wavelength side by 0.7 nm. The amount of deviation of the center wavelength of light was 0.8 nm for the aforementioned conventional optical multiplexer/demultiplexer, whereas the amount of deviation of the center wavelength of light became 0.7 nm for the optical multiplexer/demultiplexer 1 of this invention.

This result matched with 1×(7/8)×0.8=0.7 nm calculated from the equation 12 with respect to the wavelength interval of 0.8 nm of the used wavelength-multiplexed light. This showed that the optical multiplexer/demultiplexer 1 of this Example could correct the wavelength.

Although the pitches of a plurality of waveguides at both ends of the arrayed waveguide grating 5 on the input-side slab waveguide 4 side and the output-side slab waveguide 6 side in the optical multiplexer/demultiplexer 1 of this Example were set equal to each other, it is needless to say that they may be made different from each other.

The number of waveguides in the input waveguides 3 and the output waveguides 7 can be changed as needed in accordance with the design, irrespective of the number of wavelength-multiplexed lights to be used.

EXAMPLE 2

In the optical multiplexer/demultiplexer 1 shown in FIG. 1, the pitch $\Delta X1$ of the plurality of input waveguides 3 at the connecting portions to the input-side slab waveguide 4 and the pitch $\Delta X2$ of the plurality of output waveguides 7 at the connecting portions to the output-side slab waveguide 6 were respectively set to $\Delta X1$=15 $\mu$m and $\Delta X2$=20 $\mu$m ($\Delta X1:\Delta X2$=3:4), the focal length F1 of the input-side slab waveguide 4 was set equal to the focal length F2 of the output-side slab waveguide 6, and the other design parameters were set to the same as those in Example 1.

At this time, when the input waveguide 3 of the optical multiplexer/demultiplexer 1 where wavelength-multiplexed light enters is shifted by one to the fifth waveguide 3e from the fourth waveguide 3d, the amount of deviation of the center wavelength of light to be emitted to the output waveguide 7 becomes 0.6 nm (=3/4×0.8 nm) from the equation 12 in contrast to the amount of deviation of the center wavelength of light at the output waveguide is 0.8 nm when the input waveguide is shifted by one in the conventional optical multiplexer/demultiplexer.

A measurement was taken on the deviation of the center wavelength at one specific output waveguide 7 when the input waveguide 3 was shifted by one in the optical multiplexer/demultiplexer 1 of this Example and was 0.61 nm. This result nearly matched with 0.6 nm, the value of 3/4 of the wavelength interval of 0.8 nm of the used wavelength-multiplexed light based on the equation 12. This also showed that the optical multiplexer/demultiplexer 1 of this Example could correct the wavelength.

INDUSTRIAL APPLICABILITY

By using the arrayed waveguide grating of this invention, it is possible to provide an optical multiplexer/demultiplexer which can adequately correct the deviation of the center wavelength to ensure multiplexing and demultiplexing of wavelength-multiplexed light at a low cost with a high yield.

What is claimed is:

1. An optical multiplexer/demultiplexer having a plurality of first waveguides, a first slab waveguide, an arrayed waveguide grating having a plurality of waveguides, a second slab waveguide and a plurality of second waveguides, said individual waveguides being connected in the above-said order, characterized in that a ratio of a distance between said plurality of first waveguides at a connecting portion with said first slab waveguide to a distance between said plurality of second waveguides at a connecting portion with said second slab waveguide differs from a ratio of a focal length of said first slab waveguide to a focal length of said second slab waveguide.

2. The optical multiplexer/demultiplexer according to claim 1, wherein said distance between said plurality of first waveguides at said connecting portion with said first slab waveguide is equal to said distance between said plurality of second waveguides at said connecting portion with said second slab waveguide; and said focal length of said first slab waveguide differs from said focal length of said second slab waveguide.

3. The optical multiplexer/demultiplexer according to claim 1, wherein said distance between said plurality of first waveguides at said connecting portion with said first slab waveguide differs from said distance between said plurality of second waveguides at said connecting portion with said second slab waveguide; and said focal length of said first slab waveguide is equal to said focal length of said second slab waveguide.

* * * * *